UNITED STATES PATENT OFFICE.

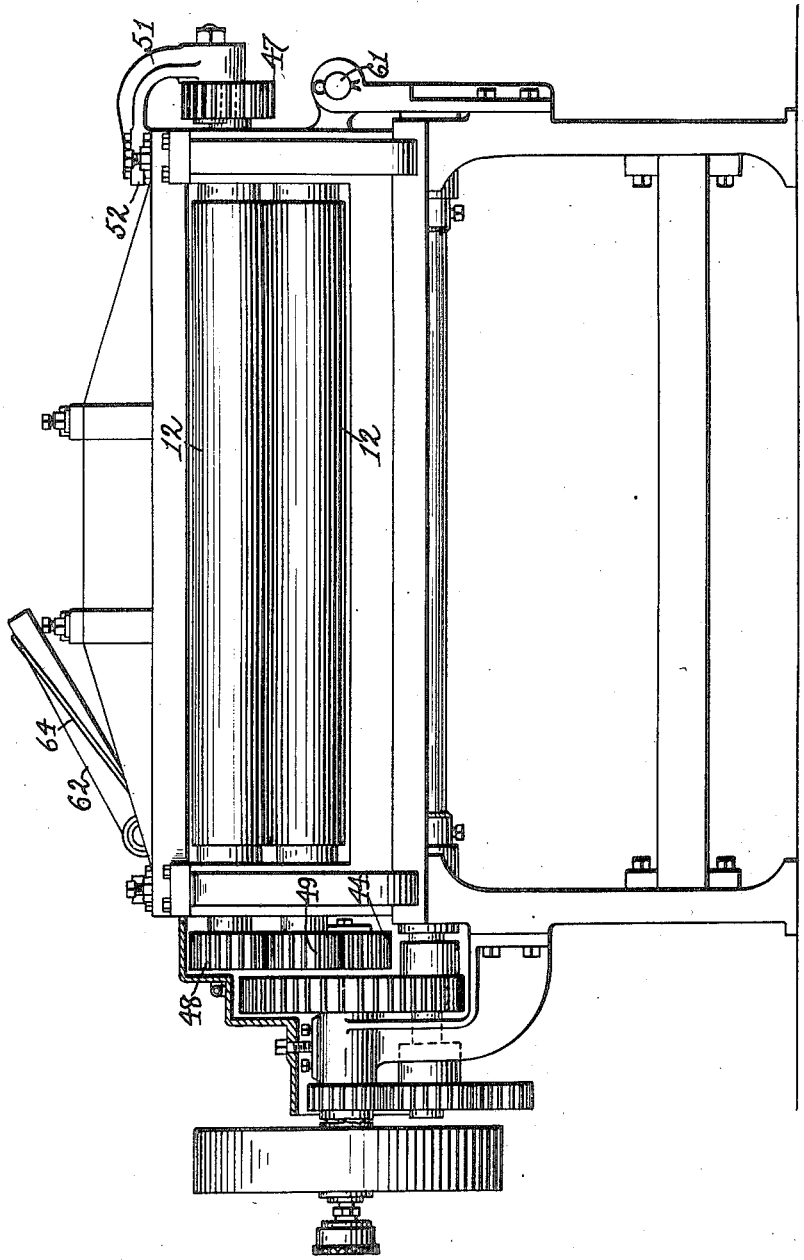

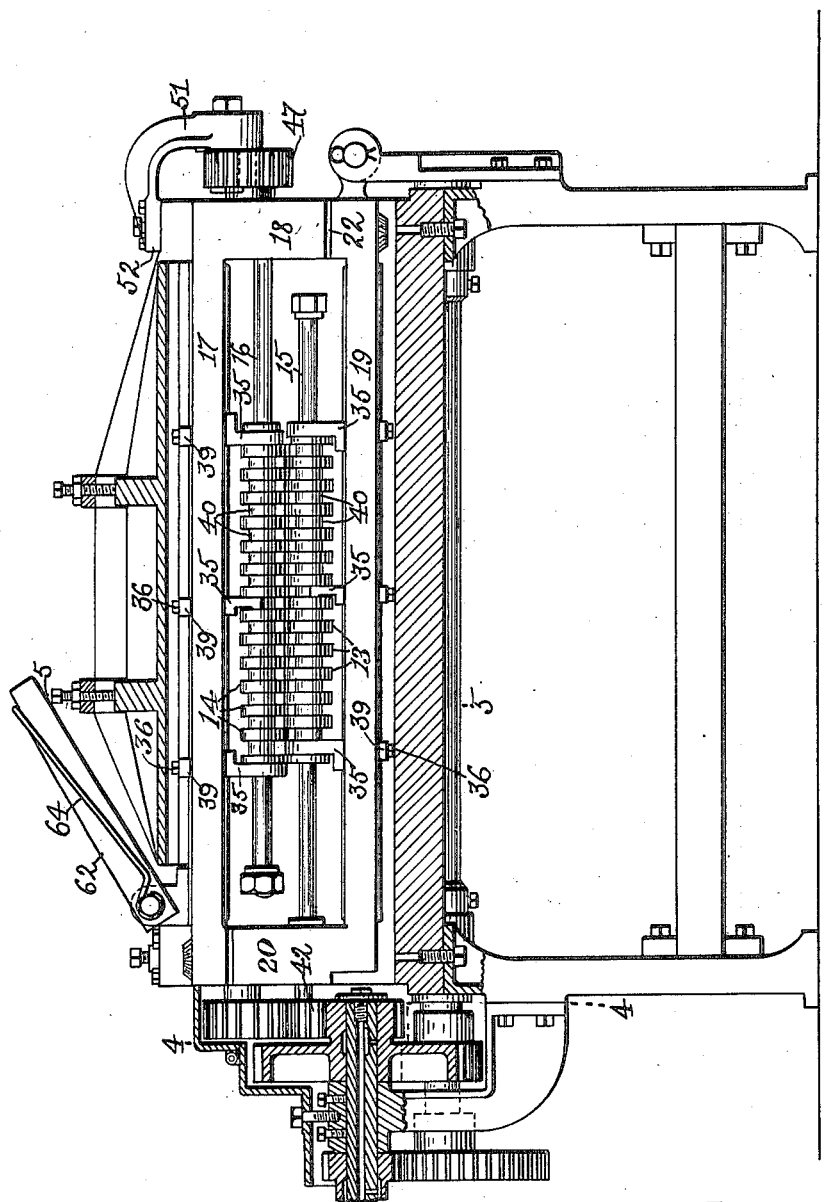

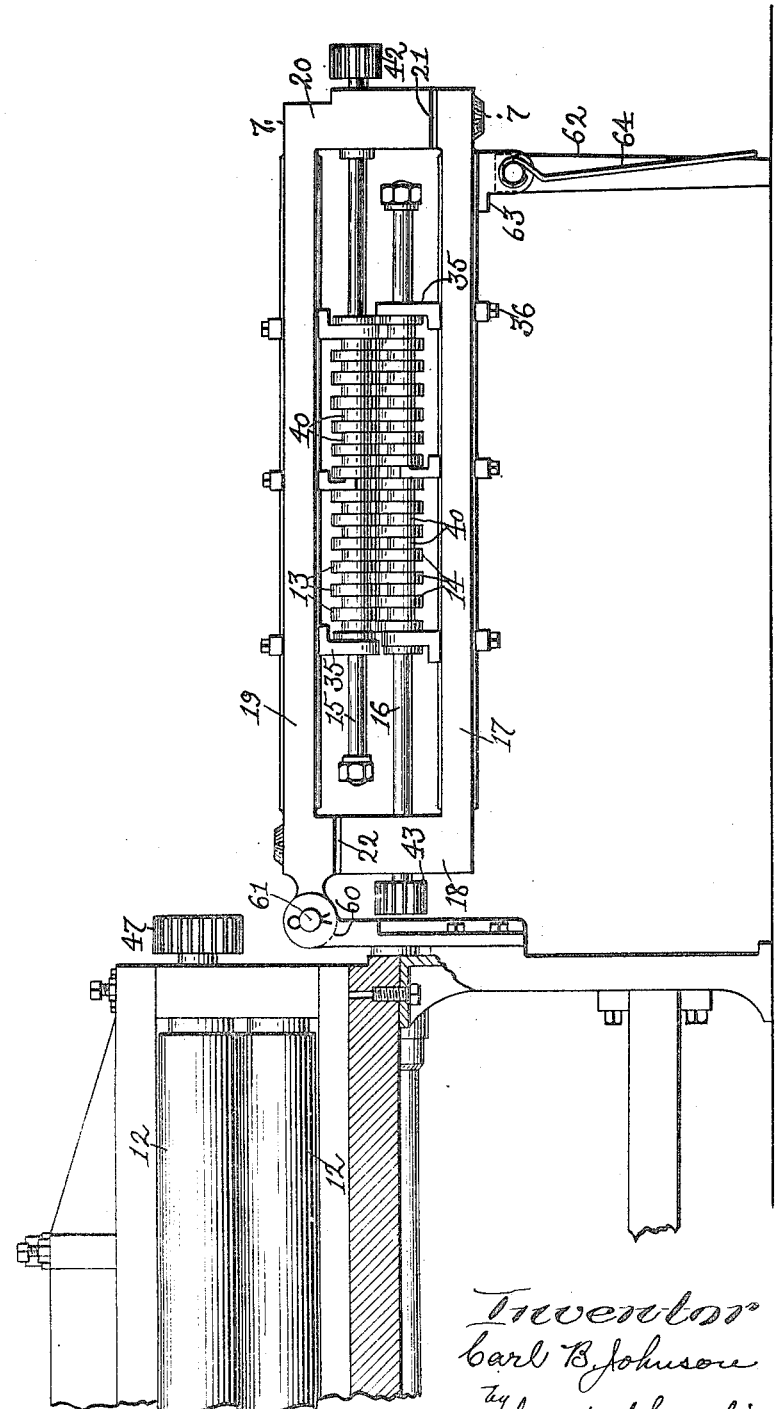

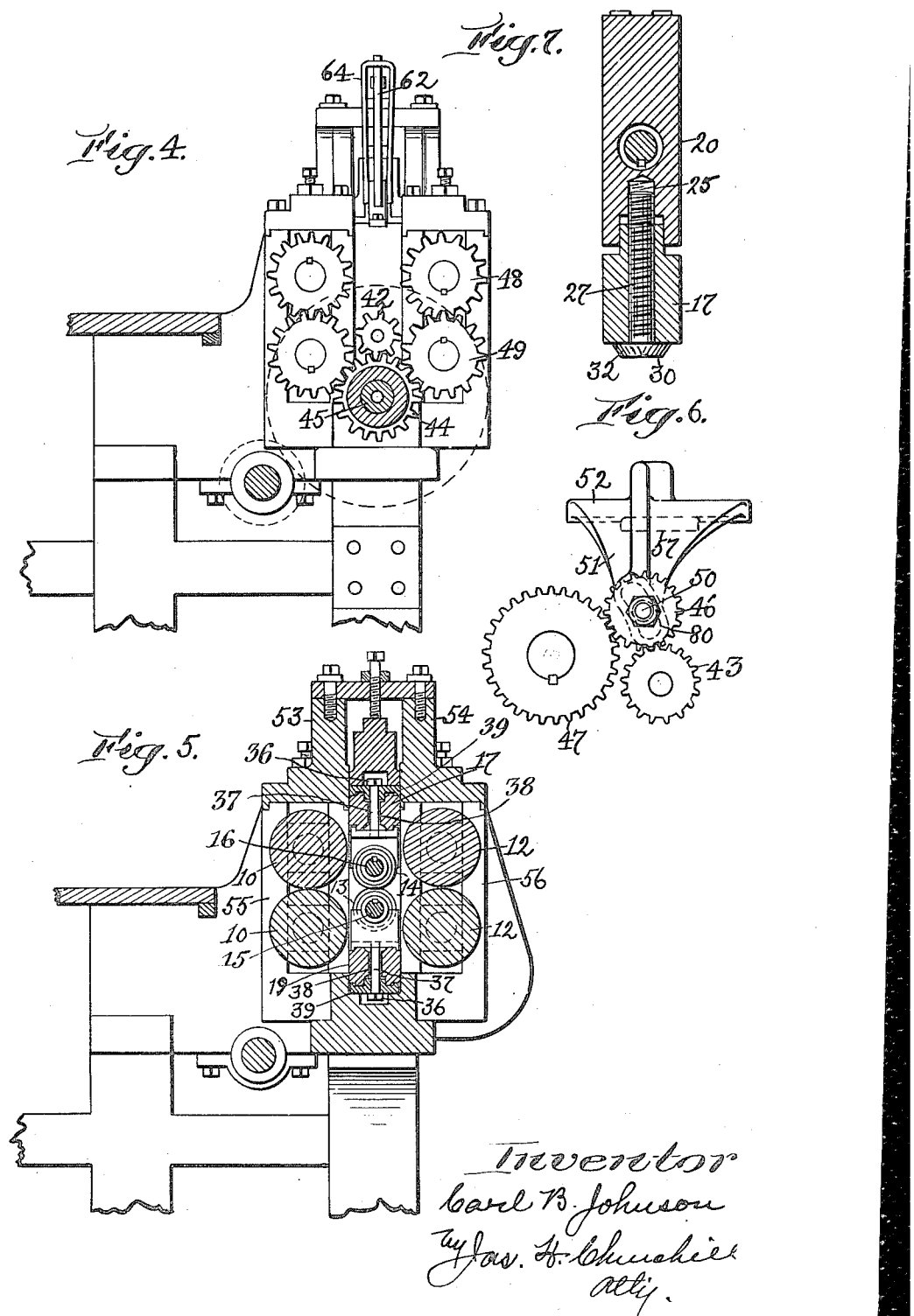

CARL B. JOHNSON, OF WINCHESTER, MASSACHUSETTS, ASSIGNOR TO LAMB & NASH COMPANY, OF BOSTON, MASSACHUSETTS, A CORPORATION OF MAINE.

MACHINE FOR CUTTING SHEETS OR LAYERS.

1,424,309.  Specification of Letters Patent.  Patented Aug. 1, 1922.

Application filed January 16, 1919. Serial No. 271,479.

*To all whom it may concern:*

Be it known that I, CARL B. JOHNSON, a citizen of the United States, residing in Winchester, in the county of Middlesex and State of Massachusetts, have invented an Improvement in Machines for Cutting Sheets or Layers, of which the following description, in connection with the accompanying drawings, is a specification, like characters on the drawings representing like parts.

This invention relates to a machine for cutting sheets or layers into strips or sections and is an improvement upon the machine shown and described in United States Patent No. 1,160,833 dated November 16, 1915.

The present invention has for its object to increase the usefulness, life and commercial value of the machine referred to, whereby the sheet or layer may be cut up into strips which are materially narrower than those which can be cut with the machine shown in the patent referred to, and whereby the cost of the cutters may be materially reduced and their usefulness materially prolonged.

These and other features of this invention will be pointed out in the claims at the end of this specification.

Fig. 1 is a front elevation of a machine embodying the invention.

Fig. 2, a cross-section of the machine shown in Fig. 1, with the cutters in elevation.

Fig. 3, a view like Fig. 2 with the cutter-carrying frame turned into position for access to the cutters.

Fig. 4, a section on the line 4—4 Fig. 1.

Fig. 5, a section on the line 5—5, Fig. 1.

Fig. 6, a detail in end elevation looking toward the left in Fig. 1, to show the drive for the upper cutter-carrying shaft, and Fig. 7, a detail in section on the line 7—7, Fig. 3.

Referring to the drawing, 10 represents a pair of feed rolls, which feed a metal or other sheet to a series of rotary cutters which cut the sheet into strips, which are fed out of the machine by a pair of delivery rolls 12.

The cutters are arranged in pairs, and each pair comprises disks 13, 14, (see Fig. 3), which are mounted on shafts 15, 16, supported by a cutter-carrying frame composed of members adjustable toward and from each other. One member comprises a side bar 17 and an end bar 18, and the other member a like side bar 19 and an end bar 20, and said members are arranged so that the end bars 18, 20, co-operate with the free ends of the side bars 17, 19, to form an open rectangular frame within which the rotary cutters 13, 14, are located.

In the present instance, the side bars 17, 19, are provided at their free ends with tongues or projections 21, 22, which enter slots in the end bars 18, 20, only one 23 of which is shown in Fig. 7, and said end bars are provided with threaded sockets 25, for the reception of adjusting screws or bolts 27, which are extended freely through holes in the side bars 17, 19, and have heads preferably in the form of disks 30, which are provided with graduations 32 designed to co-operate with suitable marks on the side members to obtain accurate adjustments of the opposite ends of the members toward and from each other. The disks 30 may be provided with suitable center projections, not shown, for the engagement therewith of a socket or other wrench, not shown, by means of which the bolts 27 may be turned.

Each member of the frame supports a cutter-carrying shaft, so that when the members of the frame are adjusted with relation to each other, the shafts carried by said members and the disk cutters mounted on said shafts are simultaneously adjusted with relation to each other.

The shaft 16 carrying the disk cutters 14 has one end extended through the end bar 18 and is supported thereby, and said shaft is also supported at or near its other end by a bearing block 35, which is secured to the side bar 17 by a nut 36 on a threaded stem or bolt 37 attached to the bearing block 35 and extended through a longitudinal slot 38 in the side bar, and through a cross bar 39 with which the nut 36 is engaged to secure the bearing block in fixed relation to the side bar 17. The cutting disks 14 are made as plain disks, that is, without hubs and are capable of being assembled upon the shaft 16 in close relation to one another when it is desired to cut the metal or other sheet into narrow strips, or the said disks may be separated from one another any desired distance within limits according to the width of strip it is desired to cut. The cutting disks 14 are separated by washers or sleeves 40 which may be of any desired length according to the width of the strip desired, and the shaft 16 may be backed up between its end bearings by blocks 350 having semi-circular recesses at their ends to engage substantially one half of the circumference of the shaft. The shaft 15 is supported in a similar manner in the other member of the frame, being extended through the end bar 20 and supported by a bearing block 35 and backed up by the intermediate blocks 350 having the semi-circular end recesses to engage substantially one-half of the circumference of the shaft 15. The disk cutters 13 on the shaft 15 are separated by the spacing washers 40. The disk cutters 13 on the shaft 15 are arranged with relation to corresponding disk cutters 14 on the shaft 16, so that adjacent faces of said cutters overlap slightly, and said disk cutters are keyed or otherwise secured to the said shafts so as to rotate therewith.

The shafts 15, 16, are separately driven, and for this purpose the shaft 15 has fast on it a pinion 42 at one end of the cutter-carrying frame, and the shaft 16 has fast on it a pinion 43 at the other end of the said frame.

The pinion 42 on the shaft 15 meshes with and is driven by a pinion 44 on the main or driving shaft 45, when the cutter carrying frame is in its operative position between the feeding-in rolls 10, and the delivery rolls 12, and the pinion 43 on the shaft 16 meshes with and is driven by an idler pinion 46 (see Fig. 6), which is driven by a gear 47 on the upper delivery roll 12, which latter is driven at its opposite end from the main shaft 45 by the pinion 44 and gears 48, 49. The pinion 46 is loosely mounted on a shaft 50 journaled in an arm 51 of a bracket 52 which is detachably secured to the upright bars or webs 53, 54 forming part of the blocks or frames 55, 56, which carry the feed and delivery rolls 10, 12.

The bracket 52 is preferably provided with a tongue 57 on its underside (see dotted lines Fig. 6), which enters the space between the webs or bars 53, 54.

The cutter-carrying frame is pivoted to the framework of the machine so that it can be turned from its operative position between the feed and delivery rolls, into its inoperative position outside of the machine, and to this end, the side bar 19 is provided at its end with a hollow boss 60 for the reception of the pivot pin 61. The side bar 17 of the other member of the frame, carries a supporting leg 62 which is pivoted to a bracket 63 and normally held substantially parallel with the bar 17 by a spring 64.

When the cutter-carrying frame is in its inoperative position with its free end supported by the leg 62 (see Fig. 3), the member comprising the bars 17, 18, can be arjusted toward the member comprising the bars 19, 20, to compensate for reduction in diameter of the cutting disks 13, 14, caused by grinding and regrinding the same on their peripheries.

By making the cutting disks as plain disks without hubs, the disks mounted on each shaft 15, 16, can be brought materially closer together and yet be kept properly spaced apart by the washers, and by using washers of different lengths, the spaces between adjacent pairs of cutters can be varied as desired, so that the metal sheet can be cut up into strips ranging in width from $\frac{1}{16}''$ upward within the limits of the machine. In the present instance, the disk cutters 13, 14, are separated by narrow washers 40, and the metal sheet passed through the machine would be cut up into the narrowest strips, which may be assumed to be $\frac{1}{16}$ of an inch in width. If it is desired to cut a sheet into wider strips, say $\frac{1}{4}$ inch in width, the disk cutters and washers used for cutting strips $\frac{1}{16}$ of an inch in width, would be removed and replaced by disk cutters and washers $\frac{1}{4}$ of an inch in width. If strips $\frac{1}{2}$ inch are to be produced, disk cutters and washers $\frac{1}{2}$ inch in width would be used, or different sizes of disk cutters and washers may be used at one time, and strips of different widths simultaneously produced.

The machine in other respects than above pointed out, is the same as that shown and described in the patent referred to, and need not be herein specifically described for a proper understanding of this invention.

In operation, the sheet to be cut into strips is fed by the feed rolls 10 to the disk cutters 13, 14, and the cut strips are fed out by the delivery rolls 12.

The arm 51 of the bracket 52 is provided with a curved slot 80 (see Fig. 6), whose radius is the center of the gear 47 which drives the idler gear 46. The slot 80 permits the idler gear 46 to be adjusted therein to follow up the movement of the pinion 42 while remaining in mesh with the driving gear 47, as the upper half of the frame is moved toward the lower half.

Claims:

1. In a machine of the character described, in combination, a stationary framework, feeding rolls and drawing rolls spaced apart and supported by said framework, a cutter-carrying frame carried by said framework and located between said rolls and movable from between the same, and composed of members movable one with relation to the other, a rotatable shaft carried by one of said frame members, a second rotatable shaft carried by the other of said frame members, disk cutters mounted on said shafts, washers mounted on said shafts to space apart the disk cutters thereon, means for adjustably connecting the members of said frame to permit them to be moved as a unit and to permit the said members to be moved toward and from each other to adjust the said cutters carried by one of said frame members toward and from the cutters carried by the other of said frame members, and means for rotating said shafts.

2. In a machine of the character described, in combination, a framework, a cutter-carrying frame supported thereby and having members movable one with relation to the other and connected together to permit the said members to be moved as a unit, rotatable shafts carried by said frame members, co-operating disk cutters mounted on said shafts to rotate therewith, means for moving said frame members and the shafts carried thereby toward and from each other to adjust the cutters carried by said shafts with relation to each other, and means for driving said shafts.

3. In a machine of the character described, a cutter carrying frame composed of members each comprising a side bar and an end bar, means for adjustably connecting the side bar of each member with the end bar of the other member, a shaft extended through the end bar of one member and supported from the side bar thereof, a second shaft extended through the end bar of the other member and supported from the side bar of said other member, and co-operating disk cutters mounted on said shafts to rotate therewith.

4. In a machine of the character described, in combination, a framework, a cutter-carrying frame supported thereby and provided with end bars, rotatable shafts carried by said frame, one of which is extended through one end bar of said frame and the other extended through the other end bar of said frame, co-operating cutters mounted on said shafts within the frame, pinions on the ends of said shafts outside of said frame, a gear in mesh with one of said pinions for driving one of said shafts, a driving gear for the other of said shafts, an intermediate pinion in mesh with the last mentioned driving gear and co-operating with the pinion on the other of said shafts, a shaft for said intermediate gear, and a support having a curved slot into which the shaft for the intermediate gear is extended and of a curvature whose radius is the center of the driving gear for said intermediate gear.

In testimony whereof, I have signed my name to this specification.

CARL B. JOHNSON.